Oct. 12, 1937. H. E. FULLER 2,095,693
RAKE
Filed Oct. 11, 1935
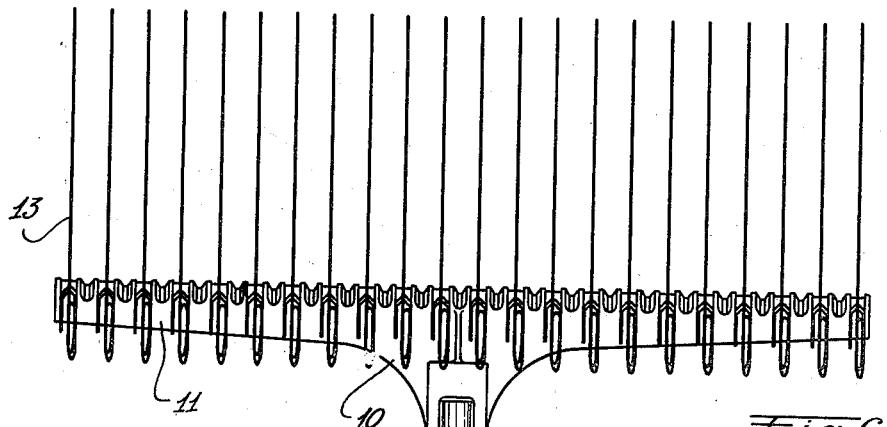
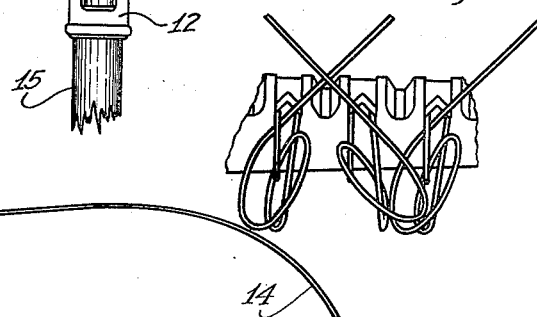
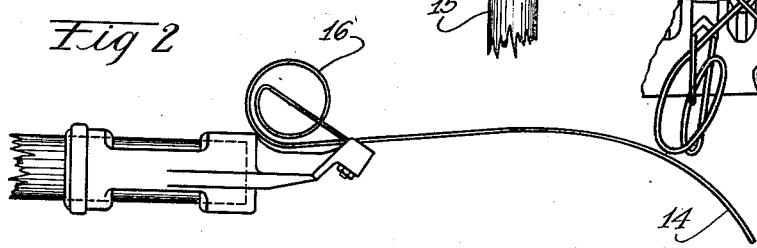
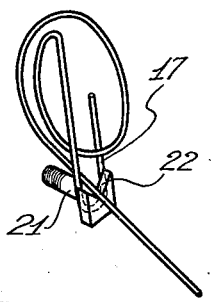
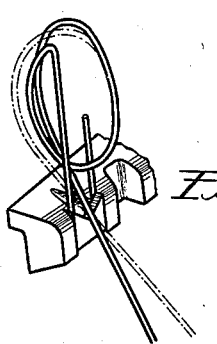
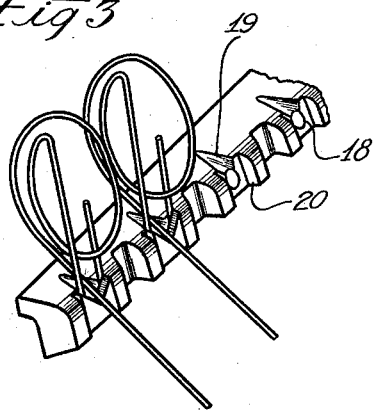
INVENTOR.
HARRY E. FULLER
BY Flournoy Corey.
ATTORNEY.

Patented Oct. 12, 1937

2,095,693

UNITED STATES PATENT OFFICE 2,095,693

RAKE

Harry E. Fuller, Newhall, Iowa

Application October 11, 1935, Serial No. 44,533

5 Claims. (Cl. 55—114)

My invention relates to broom type rakes and has particular relation to rakes which employ spring wire for the rake teeth with a bar to which the teeth are engaged.

Devices of this character made according to the teachings of the prior art and with which I am familiar have had certain defects. It has been my observation that some were of flimsy construction and soon broke down under usage. In others, no adequate provision was made for keeping the teeth in a proper spaced relationship and alignment. Such devices did not secure uniform coverage in operation and were otherwise unsatisfactory. Others were so constructed that the teeth did not have the resiliency necessary for proper action with the consequent result that the teeth soon became bent and distorted. Still others did not employ a simple and positive means for fastening the teeth to the bar that would be applicable to various type rakes.

It is accordingly an object of my invention to provide a broom type rake or lawn broom in which in use the teeth will distort and pass around objects but will spring back instantly to proper and correct alignment as soon as they are released.

Another object of my invention is to provide a spring tooth structure so constructed and arranged that the spring portion of the teeth will not lock upon themselves as the tooth swings from side to side, nor will the teeth interlock while in use.

Another object of my invention is to provide a rake having teeth which may be bent almost at right angles with their normal position.

It is another object of my invention to provide a broom type rake in which the teeth are held in a fixed properly spaced relationship.

It is a further object of my invention to provide a lawn broom in which the teeth are resilient enough that they do not readily become permanently bent or distorted.

It is still another object of my invention to provide a simple and positive means and method of holding the teeth which are applicable to large rakes such as side delivery rakes, hay tedders, hay loaders, street sweepers, cylinder sweepers, spring tooth cultivators, spring tooth hoes, or the like, as well as small lawn brooms.

My invention is especially applicable in connection with an apparatus such as a side delivery rake in which the teeth are dragged at an angle with the consequent possibility of rapid permanent misalignment. In a device constructed according to the principles of my invention such misalignment of the teeth does not readily occur.

According to a preferred embodiment of my invention I provide an integral cast bar of a suitable material and having slots arranged therein in suitable spaced relationship. Wire teeth of the proper resiliency are fastened in the slots of the bar by a simple and positive means. Such a construction provides a simple and rugged device.

The novel features that I consider characteristic of my invention are set forth with particularity in the appended claims. The invention itself, however, both as to its organization and its method of operation, together with additional objects and advantages thereof, will best be understood from the following description of a specific embodiment, when read in conjunction with the accompanying drawing, in which:

Figure 1 is a plan view of a lawn broom constructed in accordance with the principles of my invention.

Figure 2 is a view in side elevation of the device shown in Figure 1.

Figure 3 is a partial view in perspective showing how the wire teeth are engaged to the rake bar.

Figure 4 is a partial view in perspective of one of the teeth and the means for fastening the tooth to the rake bar.

Figure 5 is a partial view in perspective illustrating how the outer portion of the coil spring of a tooth passes over the inner portion without interference, and Figure 6 is a partial plan view illustrating how adjacent teeth may be distorted without interference with each other.

While I have illustrated and described my invention in connection with a lawn broom, it is apparent that the principles of the invention are applicable to many types of rakes such as side delivery rakes, hay tedders, hay loaders, street sweepers or cylinder sweepers and the like, and wherever I use the term lawn broom all similar structures are included.

The device shown in Figures 1 and 2 comprises a main frame 10 that may be cast integrally from any suitable material, or may be cut or formed from wood, molded material, or the like. The main frame 10, as here illustrated, comprises a bar 11 and a socket 12, in which socket a handle 15 may be inserted. The bar 11 is slotted along its forward edge to receive spring wire teeth 13 as hereinafter described.

The teeth are constructed of a single piece of spring wire formed to provide an arc-like sweeping portion 14. The inner end is formed into a spiral coil 16 with the free end bent in a U-shaped portion 17 through which the arc-like portion 14 is passed. Such construction provides a resilient tooth which will stand up well under rough usage and will permit a wide range of action without permanent distortion.

As heretofore mentioned, the bar 11 of the main frame 10 is slotted at its forward extremity. Alternate slots 20 along the bar are cored out or drilled to provide holes 18.

The slots 20 in which are located the drilled holes 18 are provided with depressions 19 at the trailing edge thereof for accommodating the spring wire of the teeth 13. The purpose of the depressions is to provide a relatively flat supporting surface for the spring wire of the teeth.

Flat headed bolts 21 are provided as the means for fastening the teeth in place on the bar. The heads of the bolts are notched to provide a V-shaped portion 22 the portion of which will be hereinafter explained.

In assembling the structure the spring wire teeth 13 are placed in position on the bar in the properly spaced slots 12. The U-shaped portions 17 of the teeth are engaged by the slots 20. The flat-head bolts 21 are slipped through the U-shaped portions 17 of the teeth with the V-shaped portion 22 of the bolt uppermost so that, by reason of the resiliency of the teeth the portion 14 of the teeth is received therein. The bolts pass through the drilled holes 18 and are engaged on the opposite side of the bar by a threaded nut which is then tightened.

The means of fastening the teeth to the bar is thus simple and positive. The V-shaped head on the bolts also provides a simple alignment maintaining means. It can readily be understood that the teeth are allowed a certain freedom of movement and in the operation of the rake the teeth will readily pass around objects yet will spring back to proper and correct alignment because of the inherent resiliency of the teeth and the guide means afforded by the notched bolt heads and the depression at the trailing edges of the slots in the bar.

A device constructed according to my invention possesses many advantages. It may be forcibly driven against rocks, posts and like obstacles, without injury to the device and without permanently distorting the teeth and without destroying its efficiency as a rake. The teeth will not become tangled or locked on themselves or one another.

Although I have shown and described certain specific embodiments of my invention, I am fully aware that many modifications thereof are possible. My invention therefore is not to be restricted except insofar as is necessitated by the prior art and by the spirit of the appended claims.

I claim as my invention:

1. In a broom type rake, an integrally cast main frame having a portion thereof slotted at spaced intervals, resilient teeth formed with coiled and U-shaped portions at one end thereof for insertion in the slots of the slotted portion of the main frame, and means for fastening the teeth within the slots comprising bolts with a portion of the head cut in a V the V affording a guide means for keeping the sweeping portions of the teeth in center relation in the slots.

2. In a broom type rake, a main frame having a slotted portion, and means for fastening resilient teeth in the slotted portion comprising bolts having the heads formed with a V-shaped opening whereby when the rake teeth are not under strain the sweeping portions of the teeth are kept in center relation in the slots by virtue of the inherent tension in the teeth and the guide means afforded by the V-shaped opening.

3. In a broom type rake, a main frame having a slotted portion, spring wire teeth having U-shaped portions adapted to be engaged in the slotted portion of the main frame by virtue of the U-shaped portion of the teeth being received in the slots of the main frame, fastening means for holding the teeth in place comprising bolts with V-shaped openings in the heads thereof the V-shaped opening being arranged to cooperate with the sweeping portion of the teeth whereby a certain freedom of movement is assured the sweeping portion of the teeth when under strain but whereupon release of said strain the teeth return to their proper alignment by virtue of the guiding means afforded by the V-shaped opening in the bolt heads.

4. In a broom type rake, a main frame, spring teeth secured to the main frame with a portion of each tooth resting on fastening means on the main frame, fastening means for fastening the spring teeth to the main frame, the fastening means comprising a bolt having a squared head and being slotted at the part thereof at which the spring tooth contacts the fastening means, whereby the fastening means acts not only as such but also as a guide for the spring teeth.

5. In a broom type rake, a main frame, a spring tooth having a loop adapted to be engaged in the main frame, means for fastening the looped portion of the spring to the main frame and the spring being further arranged with a spring loop passing between the sides of the first named loop whereby the first named loop acts as a guide for the second loop and the fastening means being slotted and the spring tooth being biased toward the slotted portion of the fastening means and passing thereover whereby the spring tooth is biased to a predetermined position.

HARRY E. FULLER.